United States Patent
Yan

(10) Patent No.: US 11,335,281 B2
(45) Date of Patent: May 17, 2022

(54) IMAGE PROCESSING METHOD AND IMAGE PROCESSING SYSTEM

(71) Applicant: BOE Technology Group Co., Ltd., Beijing (CN)

(72) Inventor: Xinquan Yan, Beijing (CN)

(73) Assignee: BOE Technology Group Co., Ltd, Beijing (CN)

( * ) Notice: Subject to any disclaimer, the term of this patent is extended or adjusted under 35 U.S.C. 154(b) by 0 days.

(21) Appl. No.: 17/342,806

(22) Filed: Jun. 9, 2021

(65) Prior Publication Data

US 2022/0076639 A1 Mar. 10, 2022

(30) Foreign Application Priority Data

Sep. 4, 2020 (CN) .......................... 202010923751.6

(51) Int. Cl.
*G09G 3/34* (2006.01)

(52) U.S. Cl.
CPC ..... *G09G 3/344* (2013.01); *G09G 2320/0666* (2013.01); *G09G 2370/022* (2013.01)

(58) Field of Classification Search
CPC ...................................................... G09G 3/344
See application file for complete search history.

(56) References Cited

U.S. PATENT DOCUMENTS

2003/0086595 A1* 5/2003 Hu ............................ G06T 9/00
382/128
2017/0094101 A1* 3/2017 Saito .................. H04N 1/00106

* cited by examiner

*Primary Examiner* — Gustavo Polo
(74) *Attorney, Agent, or Firm* — IPRO, PLLC

(57) ABSTRACT

An image processing method, an image processing system, an electronic device and a storage medium. The image processing method is applied to the server, and includes: receiving an image processing request sent by a terminal, wherein the image processing request includes an original-image information and an electronic-device information; determining a displaying protocol of an electronic device according to the electronic-device information, and processing the original-image information according to the displaying protocol, to obtain a target-image information; and sending the target-image information and the displaying protocol to the electronic device.

19 Claims, 7 Drawing Sheets receiving an image processing request, wherein the image processing request comprises an original-image information and an electronic-device information ~S11 determining a displaying protocol of an electronic device according to the electronic-device information, and processing the original-image information according to the displaying protocol, to obtain a target-image information ~S12 sending the target-image information and the displaying protocol to the electronic device ~S13 receiving an image processing request, wherein the image processing request comprises an original-image information and an electronic-device information ~S11 determining a displaying protocol of an electronic device according to the electronic-device information, and processing the original-image information according to the displaying protocol, to obtain a target-image information ~S12 sending the target-image information and the displaying protocol to the electronic device ~S13

Fig. 1

| | byte | 0 | 1 | 2 | | 3~12 | 13 | 14 | 15 | 16 | 17 | 18 | | 19~22 | 23 | 24 | 25~39 |
|---|---|---|---|---|---|---|---|---|---|---|---|---|---|---|---|---|---|
| | bit | CRC 16 check high level | CRC 16 check low level | D7~D2 version number | D1~D0 type of data stream | serial number | resolution (x) high level | resolution (x) low level | resolution (y) high level | resolution (y) low level | image sheet quantity | D7~D4 outputted color | D3~D0 grayscale setting | packet length | scanning mode | carousel setting | reserved expansion |
| message header | meaning | | | | | | | | | | | | | | | | |
| | default value | X | X | 0b000001 | 0b01 | X | X | X | X | X | X | X | X | X | 0b000001 | 0XFF | X |
| | instruction | | | v1 | 1:image data 2:others | | | | | | | 0: black-white mode 1 (black-1 white-0) 1: black-white mode 2 (black-0 white-1) 10: black-white-red mode 01 (black-11 white-00 red-10) 11: black-white-red mode 02 (black-00 white-10 red-01) 20: black-white-yellow mode 01 (black-XX white-XX red-XX) ... Note: 10 application scene: handhold EPD 11 application scene: conference table card | 0: no grayscale 1: grayscale | 4 bytes, less than 16M | scanning mode of terminal processing: 0: reserved, left unused 1: from left to right and from top to bottom 2: from left to right and from bottom to top 3: from right to left and from top to bottom 4: from right to left and from bottom to top 5: from top to bottom and from left to right 6: from top to bottom and from right to left 7: from bottom to top and from left to right 8: from bottom to top and from right to left 11: from left to right and from top to bottom twice 12: from left to right and from bottom to top twice 13: from right to left and from top to bottom twice | carousel forbidden | |
| service content | | | | | | | | | | | | | | | | | |

Fig. 2

IMAGE PROCESSING METHOD AND IMAGE PROCESSING SYSTEM

CROSS REFERENCE TO RELEVANT APPLICATIONS

The present disclosure claims the priority of the Chinese patent application filed on Sep. 4, 2020 before the Chinese Patent Office with the application number of 202010923751.6 and the title of "IMAGE PROCESSING METHOD AND IMAGE PROCESSING SYSTEM", which is incorporated herein in its entirety by reference.

TECHNICAL FIELD

The present disclosure relates to the technical field of displaying, and particularly relates to an image processing method, an image processing system, an electronic device and a storage medium.

BACKGROUND

In recent years, electronic devices based on the technique of Electrophoresis Display (for short, EPD), because of their characteristics of small thickness and weight, a low cost, a good comfortableness and an extremely low power consumption, have become an important device for exhibiting and collecting terminal information in the current solutions of the Internet of Things (IoT). The technique of EPD electronic paper has been extensively applied in oncoming industries such as intelligent traffic, intelligent medical treatment and intelligent office work, for example, as the electronic price tag in the retail industry, as the electronic label in the education industry, and so on.

SUMMARY

The present disclosure provides an image processing method and an image processing system. The technical solutions of the present disclosure are as follows:

According to a first aspect of the present disclosure, there is provided an image processing method, wherein the method is applied to a server, and the method comprises:

receiving an image processing request, wherein the image processing request comprises an original-image information and an electronic-device information;

determining a displaying protocol of an electronic device according to the electronic-device information, and processing the original-image information according to the displaying protocol, to obtain a target-image information; and sending the target-image information and the displaying protocol to the electronic device.

In an optional implementation, before the step of sending the target-image information and the displaying protocol to the electronic device, the method further comprises:

storing the target-image information and the displaying protocol in the server.

In an optional implementation, the step of sending the target-image information and the displaying protocol to the electronic device comprises:

sending the target-image information and the displaying protocol to an information relaying device, and sending by the information relaying device the target-image information and the displaying protocol to the electronic device.

In an optional implementation, the original-image information comprises a plurality of color grayscale values of a plurality of image pixels, the displaying protocol comprises outputted-color identifiers, the outputted-color identifiers are for indicating outputted colors that are supported by the electronic device, and the step of processing the original-image information according to the displaying protocol comprises:

according to a predetermined transformation rule, transforming the plurality of color grayscale values of each of the image pixels, to obtain an image information of the outputted colors that are supported by the electronic device.

In an optional implementation, the displaying protocol is a binary sequence containing a preset quantity of bytes, the binary sequence comprises information bytes and reserved expanded bytes, and the information bytes contain at least one of the following types of information: a version number of the protocol, a type of a data stream, a message serial number, a resolution, an image sheet quantity, an outputted-color mode, a grayscale setting, a packet length, a scanning mode of the electronic device, whether to perform carousel, and a whole-message-packet CRC cyclic check code.

In an optional implementation, the displaying protocol is a displaying protocol applicable to an electrophoretic display screen, the outputted colors that are supported by the electronic device are two colors of black and white or three colors of black, white and red, and the image information of the outputted colors that are supported by the electronic device is an image information of the two colors of black and white or an image information of the three colors of black, white and red.

According to a second aspect of the present disclosure, there is provided an image processing method, wherein the image processing method is applied to an electronic device, and the method comprises:

receiving a target-image information and a displaying protocol sent by a server;

according to the displaying protocol, decoding the target-image information, to obtain a displayed-image information; and displaying the displayed-image information on a screen of the electronic device.

In an optional implementation, the displaying protocol contains a scanning mode supported by the electronic device, and the step of displaying the displayed-image information on the screen of the electronic device comprises:

according to the scanning mode supported by the electronic device, performing refresh-scanning to the displayed-image information and displaying the displayed-image information on the screen of the electronic device;

wherein the scanning mode comprises a scanning starting point and a scanning direction that are supported by the electronic device, the scanning starting point is one of four corners of the screen, and the scanning direction is an anticlockwise direction or a clockwise direction.

In an optional implementation, the screen of the electronic device is an electrophoretic display screen.

According to a third aspect of the present disclosure, there is provided an image processing system, wherein the system comprises a terminal, a server and an electronic device;

the terminal is configured for sending an image processing request to the server, wherein the image processing request comprises an original-image information and an electronic-device information;

the server is configured for: receiving the image processing request sent by the terminal; determining a displaying protocol of an electronic device according to the electronic-device information, and processing the original-image information according to the displaying protocol, to obtain a target-image information; and sending the target-image information and the displaying protocol to the electronic device; and the electronic device is configured for: receiving the target-image information and the displaying protocol sent by the server; according to the displaying protocol, decoding the target-image information, to obtain a displayed-image information; and displaying the displayed-image information on a screen of the electronic device.

In an optional implementation, the system further comprises an information relaying device and a gateway device;

the server is further configured for sending the target-image information and the displaying protocol to the information relaying device;

the information relaying device is configured for receiving the target-image information and the displaying protocol, and sending the target-image information and the displaying protocol to the gateway device; and the gateway device is configured for receiving the target-image information and the displaying protocol, and sending the target-image information and the displaying protocol to the electronic device by using a predetermined communication protocol.

In an optional implementation, the predetermined communication protocol comprises LoRa or WiFi.

In an optional implementation, the displaying protocol contains a scanning mode supported by the electronic device, and the electronic device is further configured for:

according to the scanning mode supported by the electronic device, performing refresh-scanning to the displayed-image information and displaying the displayed-image information on the screen of the electronic device;

wherein the scanning mode comprises a scanning starting point and a scanning direction that are supported by the electronic device, the scanning starting point is one of four corners of the screen, and the scanning direction is an anticlockwise direction or a clockwise direction.

In an optional implementation, the screen of the electronic device is an electrophoretic display screen.

According to a fourth aspect of the present disclosure, there is provided an electronic device, wherein the electronic device comprises:

a processor; and a memory configured for storing a computer instruction executable by the processor;

wherein the processor is configured for executing the computer instruction, to implement the image processing method applied to the server according to the first aspect.

According to a fifth aspect of the present disclosure, there is provided an electronic device, wherein the electronic device comprises:

a processor; and a memory configured for storing a computer instruction executable by the processor;

wherein the processor is configured for executing the computer instruction, to implement the image processing method applied to the electronic device according to the second aspect.

According to a sixth aspect of the present disclosure, there is provided a non-transient computer storage medium, wherein when an instruction in the storage medium is executed by a processor of an electronic device, the instruction enables the electronic device to implement the image processing method applied to the server according to the first aspect.

According to a seventh aspect of the present disclosure, there is provided a non-transient computer storage medium, wherein when an instruction in the storage medium is executed by a processor of an electronic device, the instruction enables the electronic device to implement the image processing method applied to the electronic device according to the second aspect.

According to an eighth aspect of the present disclosure, there is provided a computer program product, wherein when an instruction in the computer program product is executed by a processor of an electronic device, the instruction enables the electronic device to implement the image processing method applied to the server according to the first aspect.

According to a ninth aspect of the present disclosure, there is provided a computer program product, wherein when an instruction in the computer program product is executed by a processor of an electronic device, the instruction enables the electronic device to implement the image processing method applied to the electronic device according to the second aspect.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure, the figures that are required to describe the embodiments of the present disclosure will be briefly introduced below. Apparently, the figures that are described below are embodiments of the present disclosure, and a person skilled in the art can obtain other figures according to these figures without paying creative work.

FIG. 1 shows a flow chart of the image processing method according to an embodiment of the present disclosure;

FIG. 2 shows a format of the displaying protocol according to an embodiment of the present disclosure;

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

An embodiment of the present disclosure provides an image processing method, wherein the method is applied to a server. Referring to FIG. 1, the method may comprise:

Step S11: receiving an image processing request, wherein the image processing request comprises an original-image information and an electronic-device information.

In a particular implementation, the server receives the image processing request sent by a terminal. The terminal may be a terminal device such as a user mobile phone, an iPad and a computer.

The electronic-device information is related information of the electronic device for requesting to exhibit the original-image information that has been processed, and the server may, according to the electronic-device information, determine the displaying protocol supported by the corresponding electronic device. The electronic device may be a subway-handhold device, a conference-table-card device, an official-door-plate device and so on.

Figure 10:
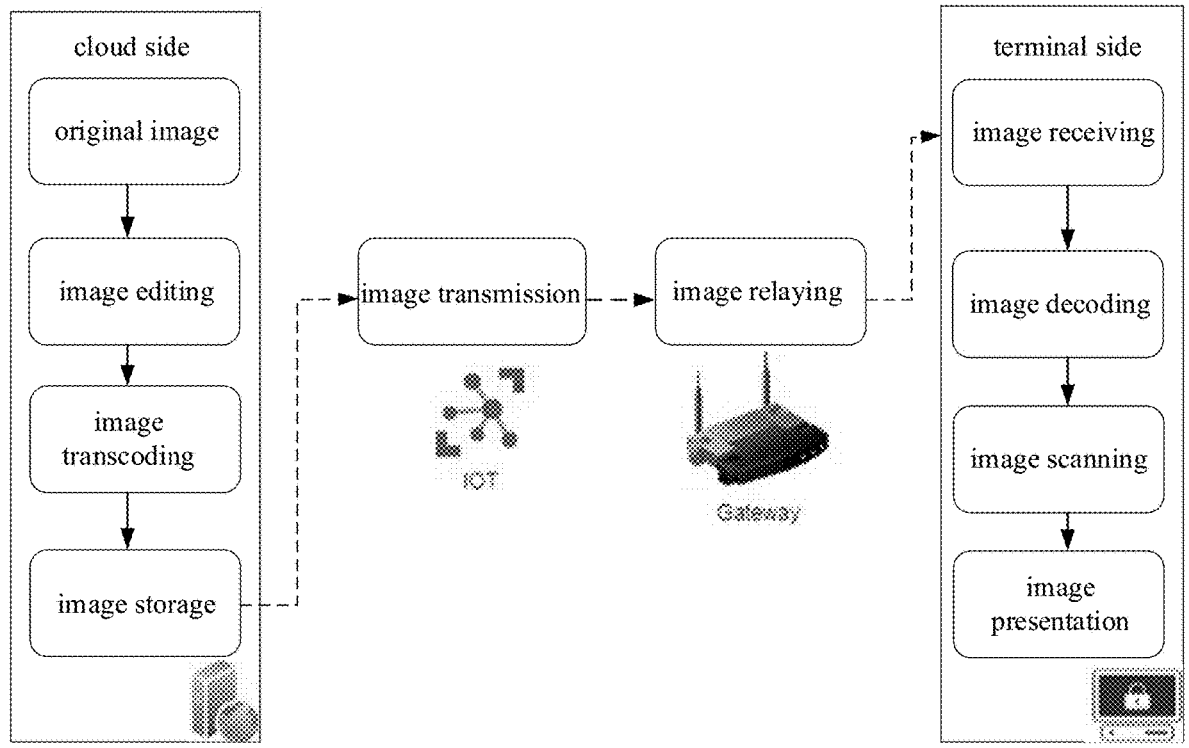
FIG. 10 shows a structural diagram of the image processing system according to an embodiment of the present disclosure.

Referring to FIG. 10, FIG. 10 shows a connection relation between and a process of data transmission between the server (the cloud side) and the electronic device (the terminal side).

In practical applications, when a user terminal has detected that the user has uploaded a picture that he intends to exhibit on a handhold device, the terminal sends an image processing request to the server, wherein the image processing request carries an original-image information and a handhold-device information.

Step S12: determining a displaying protocol of an electronic device according to the electronic-device information, and processing the original-image information according to the displaying protocol, to obtain a target-image information.

The server, after receiving the image processing request, firstly determines the displaying protocol supported by the electronic device according to the electronic-device information in the image processing request. Because the original-image information carried by the image processing request is a format information that is not supported by the electronic device (such as a handhold device), the server is required to process it according to the displaying protocol, to obtain the format information supported by the electronic device (for example, the handhold device).

In an optional implementation, the displaying protocol may be a binary sequence containing a preset quantity of bytes, the binary sequence may comprise information bytes and reserved expanded bytes, and the information bytes contain at least one of the following types of information: a version number of the protocol, a type of a data stream, a message serial number, a resolution, an image sheet quantity, an outputted-color mode, a grayscale setting, a packet length, a scanning mode of the electronic device, whether to perform carousel, and a whole-message-packet CRC cyclic check code.

Referring to FIG. 2, FIG. 2 shows the format of the displaying protocol of an electronic device. For example, the length of the displaying protocol may be defined as constant 40 bytes. The information bytes (the 0th to 24th bytes in FIG. 2) are mainly used to define the meta-information of an electronic-ink image, including a version number of the protocol, a type of a data stream, a message serial number, a resolution, an image sheet quantity, an outputted-color mode, a grayscale setting, a packet length, a scanning mode of the electronic device, whether to perform carousel, and a whole-message-packet CRC cyclic check code and so on. The reserved expanded bytes (the 25th to the 39th bytes in FIG. 2) are mainly used for subsequent expansion. For example, a space of 15 bytes may be reserved, for the image producers and the device consumers to extend freely according to demands.

In a particular implementation, an image engine in the server may, according to the displaying protocol, transcode the original-image information into the target-image information, wherein the target-image information is of a format that the electronic device can display.

In an optional implementation, the original-image information comprises a plurality of color grayscale values of a plurality of image pixels, the displaying protocol comprises outputted-color identifiers, the outputted-color identifiers are for indicating outputted colors that are supported by the electronic device, and the step S12 may particularly comprise: according to a predetermined transformation rule, transforming the plurality of color grayscale values of each of the image pixels, to obtain an image information of the outputted colors that are supported by the electronic device.

The plurality of color grayscale values may include red-color grayscale values, green-color grayscale values, blue-color grayscale values and so on. The predetermined transformation rule may, for example, be performing weighted summation or weighted averaging and so on to the plurality of color grayscale values of the image pixels. The particular predetermined transformation rule may be regulated according to practical demands, and is not limited in the present embodiment.

When the screen of the electronic device is an electrophoretic display screen (electronic ink screen), the displaying protocol may be a displaying protocol applicable to the electrophoretic display screen, the outputted colors that are supported by the electronic device are two colors of black and white or three colors of black, white and red, and the image information of the outputted colors that are supported by the electronic device is an image information of the two colors of black and white or an image information of the three colors of black, white and red.

Because the limitation of the displaying of electrophoretic display screens (EPD), for example, typical electrophoretic display screens merely support the displaying of two colors of black and white or three colors of black, white and red, it is required to process, according to the displaying protocol, the original-image information into a format supported by the electronic device.

When the outputted colors that are supported by the electronic device are the two colors of black and white, the outputted-color identifiers (encoding values) are shown in the following Table 1.

TABLE 1

Encoding values when the outputted
colors are the two colors of black and white

| outputted color | bit occupied by a single pixel | encoding values |
|---|---|---|
| black and white in the same direction | 1 | black: 0b1 white: 0b0 |
| black and white in opposite directions | 1 | black: 0b0 white: 0b1 |

When the outputted colors that are supported by the electronic device are the three colors of black, white and red, the outputted-color identifiers (encoding values) are shown in the following Table 2.

TABLE 2

Encoding values when the outputted
colors are the three colors of black, white and red

| outputted color | bit occupied by a single pixel | encoding values |
|---|---|---|
| scene 1 | 2 | black: 0b11 white: 0b00 red: 0b11 |
| scene 2 | 2 | black: 0b00 white: 0b10 red: 0b01 |

After the step S12 has been completed, the server may store the target-image information and the displaying protocol in the server. Particularly, the image engine temporarily saves the target-image-information file into the server.

Step S13: sending the target-image information and the displaying protocol to the electronic device.

In a particular implementation, the target-image information and the displaying protocol may be sent in the form of a message. The message may be divided into two parts of a message header and a service content. The message header may contain the displaying protocol (the particular format is shown in FIG. 2). The service content may contain the data volume actually related to the displaying, for example, the target-image information.

In an optional implementation, the step may particularly comprise: sending the target-image information and the displaying protocol to an information relaying device, and sending by the information relaying device the target-image information and the displaying protocol to the electronic device.

In a particular implementation, referring to FIG. 10, the server (the cloud side) may firstly send the target-image information and the displaying protocol to the information relaying device (for example, an IoT platform), the IoT platform dispatches them to a corresponding gateway device (Gateway), and the gateway device, after receiving the target-image information and the displaying protocol, may, according to an agreed communication protocol such as LoRa or WiFi, send the target-image information and the displaying protocol to the electronic device (the terminal side).

The image processing method according to the present embodiment can decouple service processing and image processing, to enable the image processing to be independent of other service processing, and eliminate the complicated interaction between the image-processing process and other service-processing processes (for example, the transmission process). The other service-processing processes are not required to pay attention to the details of the image processing, which shields the service processing from the complexity and the implementation details of the image processing, thereby reducing the complexity of the image processing, reducing the human cost, and increasing the working efficiency.

In addition, the present embodiment further defines an universal displaying protocol (EPD image encoding protocol), which can promote the standardization of diversified EPD products, facilitates the compatibility between various EPD products, releases the binding with specific electronic-device suppliers, realizes the interconnectivity between devices, and can greatly improve the flexibility of device integration. In addition, the displaying protocol reserves certain bytes, which facilitates expansion, maintenance and upgrading in the subsequent usage. Furthermore, the displaying protocol does not limit the particular implementation mode of the encoding, and has no SDK binding, which ensures the flexibility and the replaceability of the implementation.

Figure 3:
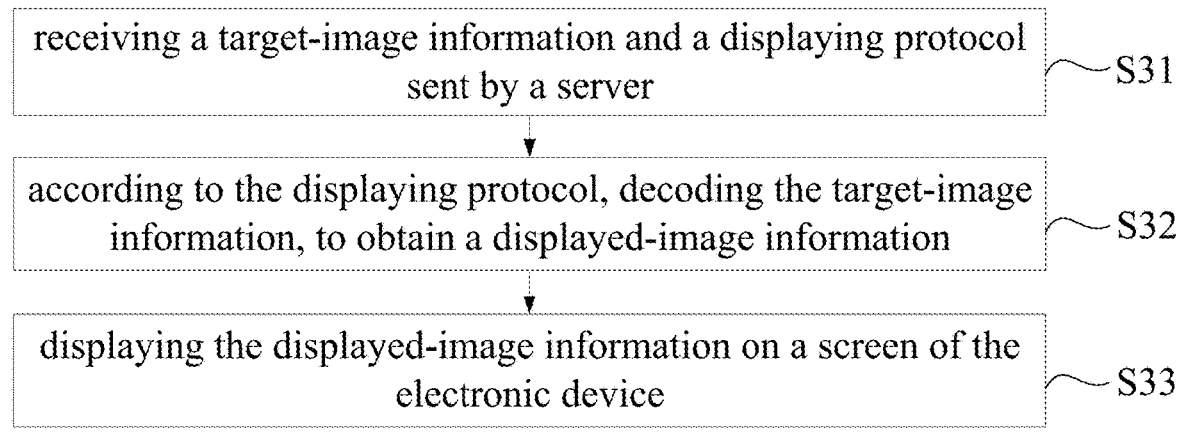
FIG. 3 shows a flow chart of the image processing method according to another embodiment of the present disclosure.

An embodiment of the present disclosure provides an image processing method, wherein the image processing method is applied to an electronic device. Referring to FIG. 3, the method may comprise:

Step S31: receiving a target-image information and a displaying protocol sent by a server.

In a particular implementation, referring to FIG. 10, the server may send the target-image information and the displaying protocol in the form of a message to the electronic device via the IoT platform and the gateway device, and the electronic device receives the target-image information and the displaying protocol.

Figure 5:
FIG. 5 shows a subway-handhold device according to an embodiment of the present disclosure.
Figure 6:
FIG. 6 shows a conference-table-card device according to an embodiment of the present disclosure.
Figure 7:
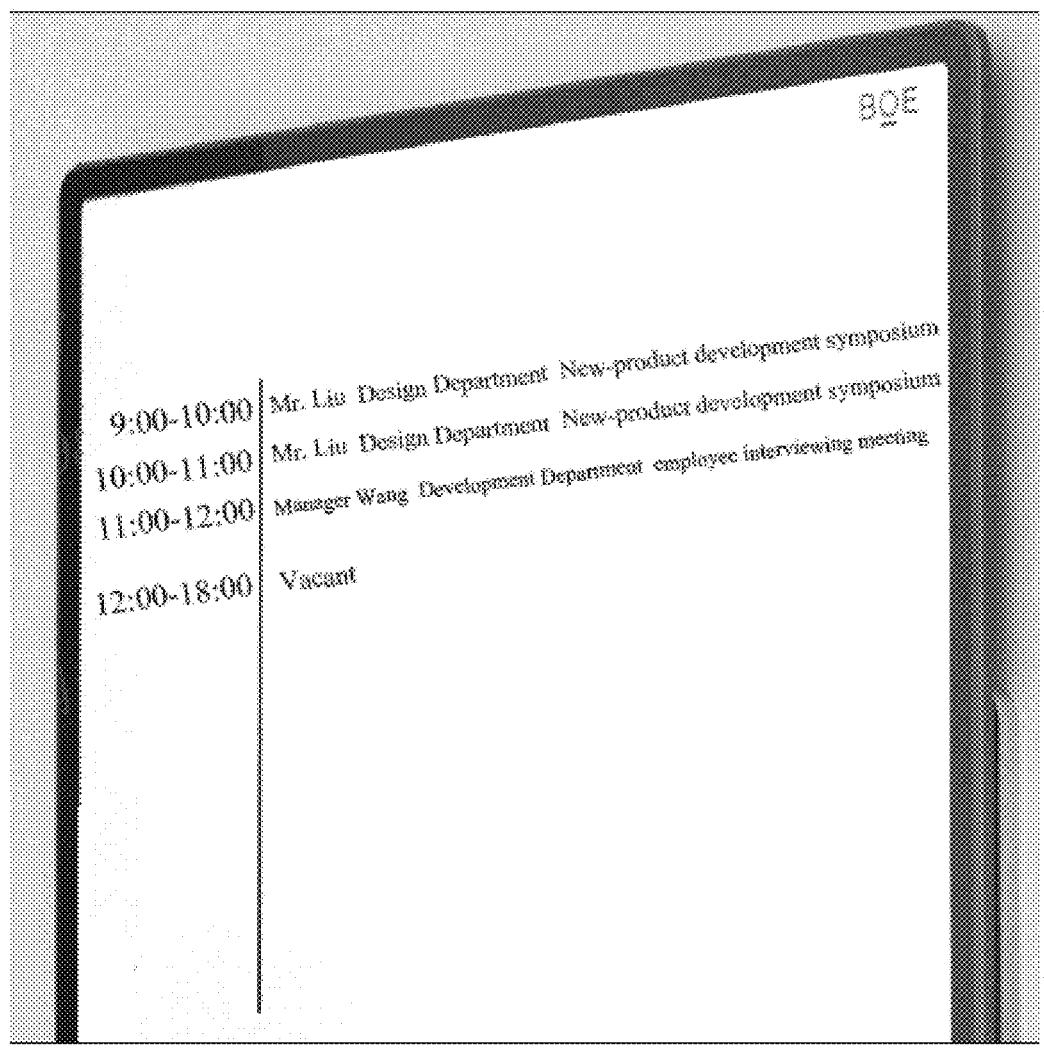
FIG. 7 shows an official-door-plate device according to an embodiment of the present disclosure.

The electronic device may be a subway-handhold device (referring to FIG. 5), a conference-table-card device (referring to FIG. 6), an official-door-plate device (referring to FIG. 7) and so on.

When the screen of the electronic device is an electrophoretic display screen (electronic ink screen), the displaying protocol may be a displaying protocol applicable to the electrophoretic display screen.

Step S32: according to the displaying protocol, decoding the target-image information, to obtain a displayed-image information.

Step S33: displaying the displayed-image information on a screen of the electronic device.

In a particular implementation, the electronic device may firstly parse the information of the message header, according to the header meta-information (the displaying protocol), including the attribute information of the image (image height, image width and picture sheet quantity) and so on, parse the data of the service content (the target-image information), and then perform refresh-scanning to the data that have been parsed (the displayed-image information) and display on the screen of the electronic device.

The displaying protocol may contain a scanning mode supported by the electronic device, and the step S33 may particularly comprise: according to the scanning mode supported by the electronic device, performing refresh-scanning to the displayed-image information and displaying the displayed-image information on the screen of the electronic device;

wherein the scanning mode comprises a scanning starting point and a scanning direction that are supported by the electronic device, the scanning starting point is one of four corners of the screen, and the scanning direction is an anticlockwise direction or a clockwise direction.

According to the scanning starting points and the scanning directions that are supported by the electronic device, the scanning mode may particularly include 8 scanning modes, as shown in the following Table 3.

TABLE 3

Types of the scanning modes

Figure 4:
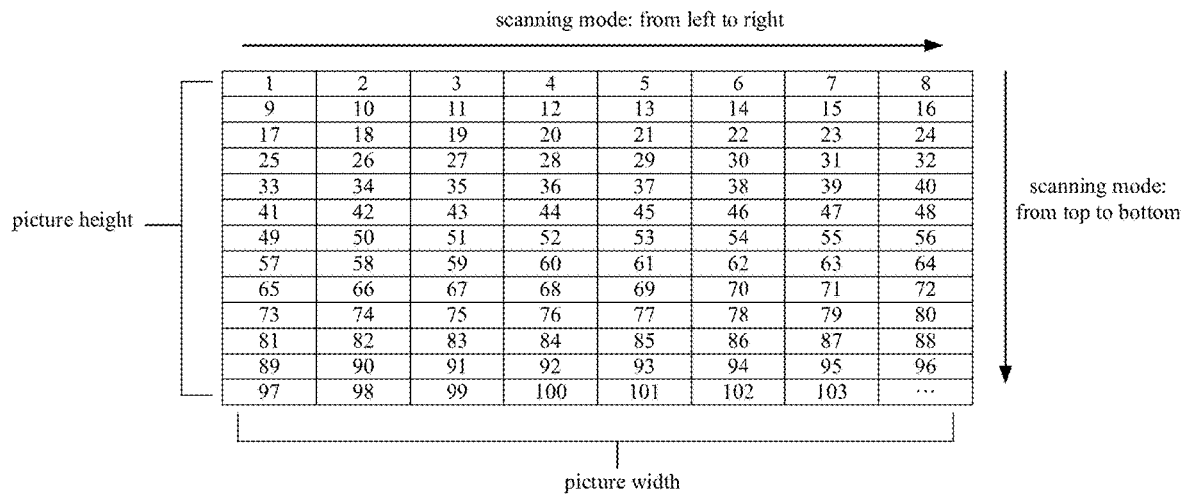
FIG. 4 shows a schematic diagram of the scanning mode according to an embodiment of the present disclosure.

| mode | scanning mode |
|---|---|
| 1 | from left to right and from top to bottom (typical; as shown in FIG. 4) |
| 2 | from left to right and from bottom to top |
| 3 | from right to left and from top to bottom |
| 4 | from right to left and from bottom to top |
| 5 | from top to bottom and from left to right |
| 6 | from top to bottom and from right to left |
| 7 | from bottom to top and from left to right |
| 8 | from bottom to top and from right to left |

The image processing method according to the present embodiment can decouple service processing and image processing, to enable the image processing to be independent of other service processing, and eliminate the complicated interaction between the image-processing process and other service-processing processes (for example, the transmission process). The other service-processing processes are not required to pay attention to the details of the image processing, which shields the service processing from the complexity and the implementation details of the image processing, thereby reducing the complexity of the image processing, reducing the human cost, and increasing the working efficiency.

Figure 8:
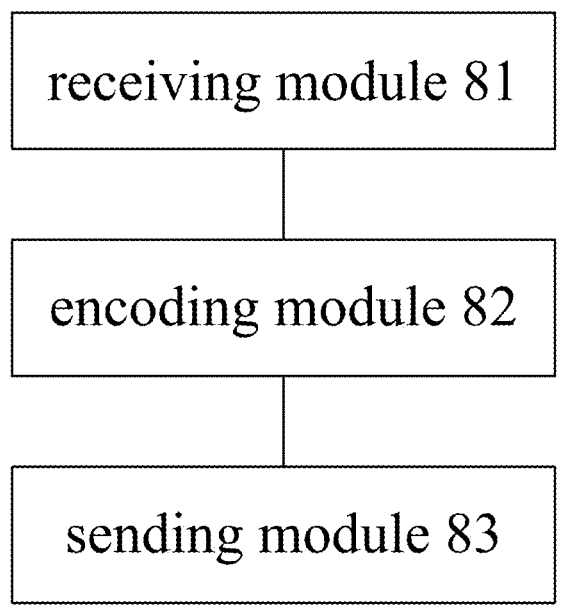
FIG. 8 shows a frame diagram of the image processing apparatus according to an embodiment of the present disclosure.

An embodiment of the present disclosure provides an image processing apparatus, wherein the image processing apparatus is applied to a server. Referring to FIG. 8, the apparatus may comprise:

a receiving module 81 configured for receiving an image processing request, wherein the image processing request comprises an original-image information and an electronic-device information;

an encoding module 82 configured for determining a displaying protocol of an electronic device according to the electronic-device information, and processing the original-image information according to the displaying protocol, to obtain a target-image information; and a sending module 83 configured for sending the target-image information and the displaying protocol to the electronic device.

The particular modes of the operations performed by the modules of the apparatus according to the embodiment have already been described in detail in the embodiments of the image processing method applied to the server, and will not be explained and described in detail herein.

Figure 9:
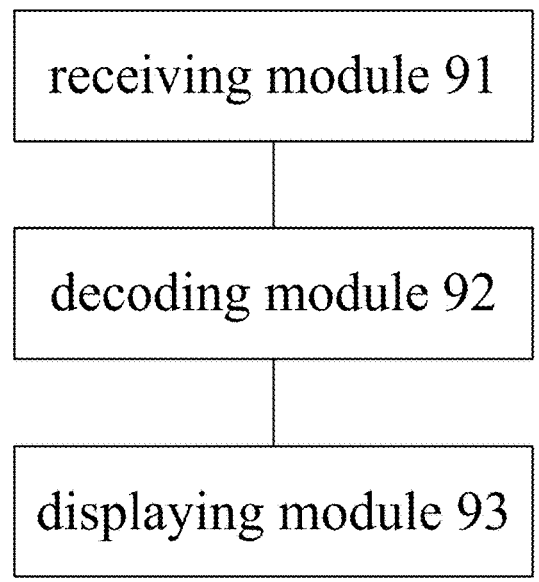
FIG. 9 shows a frame diagram of the image processing apparatus according to another embodiment of the present disclosure.

An embodiment of the present disclosure provides an image processing apparatus, wherein the image processing apparatus is applied to an electronic device. Referring to FIG. 9, the apparatus may comprise:

a receiving module 91 configured for receiving a target-image information and a displaying protocol sent by a server;

a decoding module 92 configured for, according to the displaying protocol, decoding the target-image information, to obtain a displayed-image information; and a displaying module 93 configured for displaying the displayed-image information on a screen of the electronic device.

The particular modes of the operations performed by the modules of the apparatus according to the embodiment have already been described in detail in the embodiments of the image processing method applied to the electronic device, and will not be explained and described in detail herein.

An embodiment of the present disclosure provides an image processing system. Referring to FIG. 10, the system may comprise a terminal, a server (the cloud side) and an electronic device (the terminal side);

the terminal is configured for sending an image processing request to the server, wherein the image processing request comprises an original-image information and an electronic-device information;

the server is configured for: receiving the image processing request sent by the terminal; determining a displaying protocol of an electronic device according to the electronic-device information, and processing the original-image information according to the displaying protocol, to obtain a target-image information; and sending the target-image information and the displaying protocol to the electronic device; and the electronic device is configured for: receiving the target-image information and the displaying protocol sent by the server; according to the displaying protocol, decoding the target-image information, to obtain a displayed-image information; and displaying the displayed-image information on a screen of the electronic device.

The original image uploaded by the terminal is required to satisfy a certain condition; for example, the image size is required to match with the electronic device, and so on. If the original image has a better color purity, a stronger flat-surface feel, and a higher contrast, the image displaying effect obtained after the server processing is better.

In an optional implementation, the system further comprises an information relaying device (IoT platform) and a gateway device (Gateway);

the server is further configured for sending the target-image information and the displaying protocol to the information relaying device;

the information relaying device is configured for receiving the target-image information and the displaying protocol, and sending the target-image information and the displaying protocol to the gateway device; and the gateway device is configured for receiving the target-image information and the displaying protocol, and sending the target-image information and the displaying protocol to the electronic device by using a predetermined communication protocol.

The predetermined communication protocol comprises LoRa or WiFi.

The particular modes of the operations performed by the terminal, the server and the electronic device of the image processing system according to the embodiment have already been described in detail in the embodiments of the image processing method, and will not be explained and described in detail herein.

An embodiment of the present disclosure provides an electronic device, wherein the electronic device may be a server, and may comprise:

a processor; and a memory configured for storing a computer instruction executable by the processor;

wherein the processor is configured for executing the computer instruction, to implement the image processing method applied to the server.

An embodiment of the present disclosure provides a storage medium, wherein when an instruction in the storage medium is executed by a processor of an electronic device, the instruction enables the electronic device to implement the image processing method applied to the server.

An embodiment of the present disclosure provides a computer program product, wherein when an instruction in the computer program product is executed by a processor of an electronic device, the instruction enables the electronic device to implement the image processing method applied to the server.

An embodiment of the present disclosure provides an electronic device, wherein the electronic device may be a subway-handhold device, a door-plate device or a table-card device, and may comprise:

a processor; and a memory configured for storing a computer instruction executable by the processor;

wherein the processor is configured for executing the computer instruction, to implement the image processing method applied to the electronic device.

An embodiment of the present disclosure provides a storage medium, wherein when an instruction in the storage medium is executed by a processor of an electronic device, the instruction enables the electronic device to implement the image processing method applied to the electronic device.

An embodiment of the present disclosure provides a computer program product, wherein when an instruction in the computer program product is executed by a processor of an electronic device, the instruction enables the electronic device to implement the image processing method applied to the electronic device.

The embodiments of the present disclosure provide an image processing method, an image processing system, an electronic device and a storage medium, which can decouple service processing and image processing, to shield the service processing from the complexity and the implementation details of the image processing, thereby reducing the complexity of the image processing, reducing the human cost, and increasing the working efficiency. In addition, the present disclosure provides an universal encoding protocol, which can be compatible with various current EPD products, whereby a service application, by using the relevant definitions in the protocol, flexibly self-develops an image engine to perform the relevant encoding. Moreover, the EPD terminal, according to and referring to the relevant protocol standards, according to the displaying characteristics of itself, flexibly decodes and displays the relevant image. Accordingly, the binding between the image producers and the device end manufacturers can be released, the manufacturers freely produce according to the specifications of the protocol, which greatly improves the compatibility of device and system integration, and facilitates the establishing and prosperity of the system and device ecosystem.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the electronic device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 11:
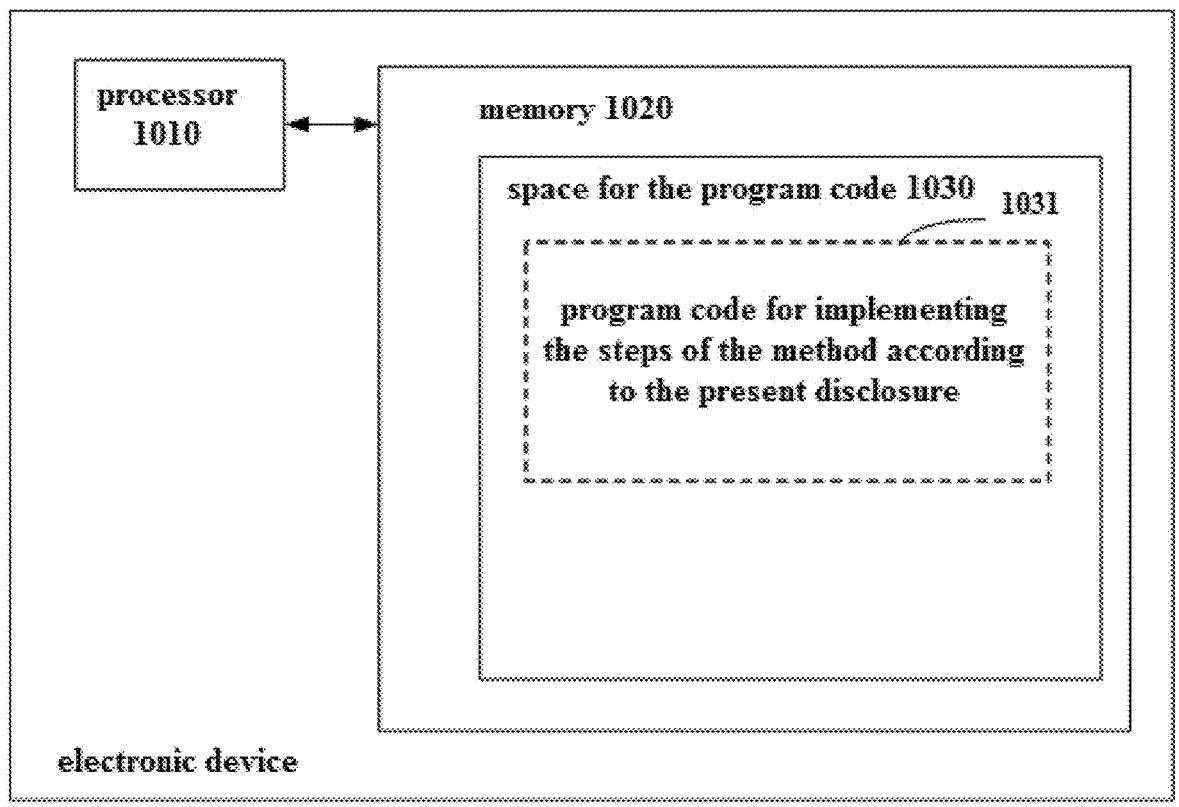
FIG. 11 schematically shows a block diagram of an electronic device for implementing the method according to the present disclosure.
Figure 12:
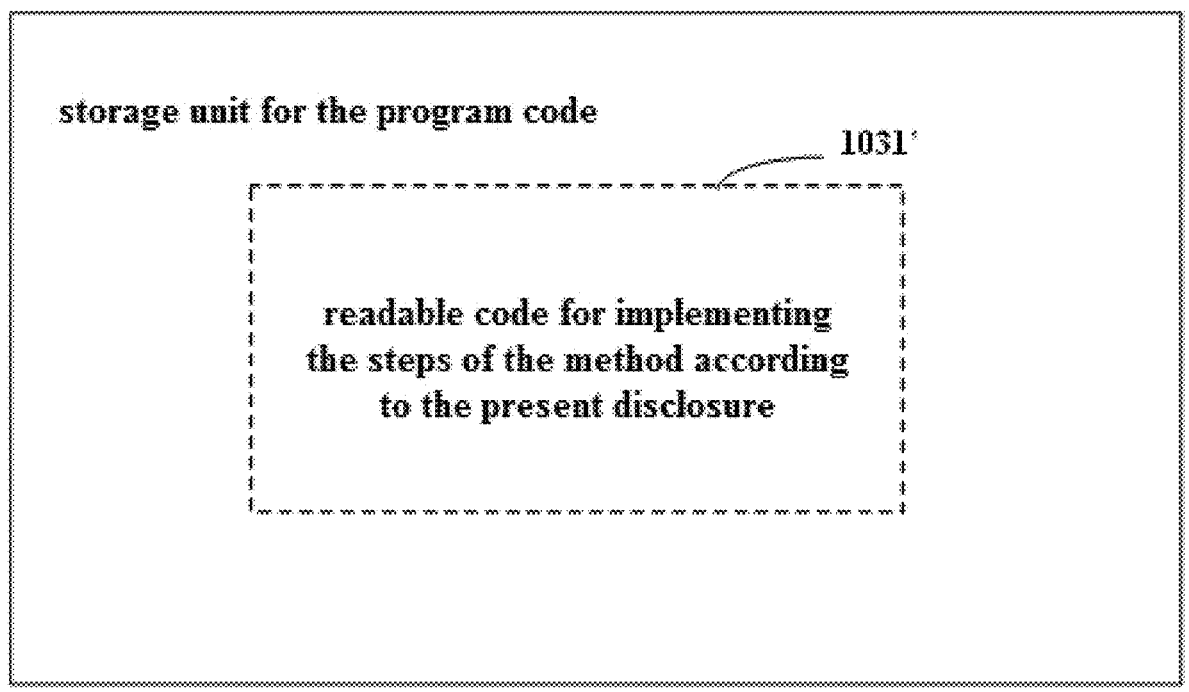
FIG. 12 schematically shows a storage unit for maintaining or carrying a program code for implementing the method according to the present disclosure.

For example, FIG. 11 shows an electronic device that can implement the method according to the present disclosure. The electronic device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 12. The storage unit may have storage segments or storage spaces with similar arrangement to the memory 1020 of the electronic device in FIG. 11. The program codes may, for example, be compressed in a suitable form. Generally, the storage unit contains a computer-readable code 1031', which can be read by a processor like 1010. When those codes are executed by the electronic device, the codes cause the electronic device to implement each of the steps of the method described above.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The image processing method and the image processing system according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An image processing method, wherein the method is applied to a server, and the method comprises:
receiving an image processing request, wherein the image processing request comprises an original-image information and an electronic-device information;
determining a displaying protocol of an electronic device according to the electronic-device information, and processing the original-image information according to the displaying protocol, to obtain a target-image information; and
sending the target-image information and the displaying protocol to the electronic device;
wherein the original-image information comprises a plurality of color grayscale values of a plurality of image pixels, the displaying protocol comprises outputted-color identifiers, the outputted-color identifiers are for indicating outputted colors that are supported by the electronic device, and the step of processing the original-image information according to the displaying protocol comprises:
according to a predetermined transformation rule, transforming the plurality of color grayscale values of each of the image pixels, to obtain an image information of the outputted colors that are supported by the electronic device.

2. The image processing method according to claim 1, wherein before the step of sending the target-image information and the displaying protocol to the electronic device, the method further comprises:
storing the target-image information and the displaying protocol in the server.

3. The image processing method according to claim 1, wherein the step of sending the target-image information and the displaying protocol to the electronic device comprises:
sending the target-image information and the displaying protocol to an information relaying device, and sending by the information relaying device the target-image information and the displaying protocol to the electronic device.

4. The image processing method according to claim 1, wherein the displaying protocol is a binary sequence containing a preset quantity of bytes, the binary sequence comprises information bytes and reserved expanded bytes, and the information bytes contain at least one of the following types of information: a version number of the protocol, a type of a data stream, a message serial number, a resolution, an image sheet quantity, an outputted-color mode, a grayscale setting, a packet length, a scanning mode of the electronic device, whether to perform carousel, and a whole-message-packet CRC cyclic check code.

5. The image processing method according to claim 1, wherein the displaying protocol is a displaying protocol applicable to an electrophoretic display screen, the outputted colors that are supported by the electronic device are two colors of black and white or three colors of black, white and red, and the image information of the outputted colors that are supported by the electronic device is an image information of the two colors of black and white or an image information of the three colors of black, white and red.

6. An image processing method, wherein the image processing method is applied to an electronic device, and the method comprises:
receiving a target-image information and a displaying protocol sent by a server;
according to the displaying protocol, decoding the target-image information, to obtain a displayed-image information; and
displaying the displayed-image information on a screen of the electronic device;
wherein the original-image information comprises a plurality of color grayscale values of a plurality of image pixels, the displaying protocol comprises outputted-color identifiers, the outputted-color identifiers are for indicating outputted colors that are supported by the electronic device, and the step of processing the original-image information according to the displaying protocol comprises:
according to a predetermined transformation rule, transforming the plurality of color grayscale values of each of the image pixels, to obtain an image information of the outputted colors that are supported by the electronic device.

7. The image processing method according to claim 6, wherein the displaying protocol contains a scanning mode supported by the electronic device, and the step of displaying the displayed-image information on the screen of the electronic device comprises:
according to the scanning mode supported by the electronic device, performing refresh-scanning to the displayed-image information and displaying the displayed-image information on the screen of the electronic device;
wherein the scanning mode comprises a scanning starting point and a scanning direction that are supported by the electronic device, the scanning starting point is one of four corners of the screen, and the scanning direction is an anticlockwise direction or a clockwise direction.

8. The image processing method according to claim 6, wherein the screen of the electronic device is an electrophoretic display screen.

9. An image processing system, wherein the system comprises a terminal, a server and an electronic device;
the terminal is configured for sending an image processing request to the server, wherein the image processing request comprises an original-image information and an electronic-device information;
the server is configured for: receiving the image processing request sent by the terminal; determining a displaying protocol of an electronic device according to the electronic-device information, and processing the original-image information according to the displaying protocol, to obtain a target-image information; and sending the target-image information and the displaying protocol to the electronic device; and
the electronic device is configured for: receiving the target-image information and the displaying protocol sent by the server; according to the displaying protocol, decoding the target-image information, to obtain a displayed-image information; and displaying the displayed-image information on a screen of the electronic device;
wherein the original-image information comprises a plurality of color grayscale values of a plurality of image pixels, the displaying protocol comprises outputted-color identifiers, the outputted-color identifiers are for indicating outputted colors that are supported by the electronic device, and the step of processing the original-image information according to the displaying protocol comprises:

according to a predetermined transformation rule, transforming the plurality of color grayscale values of each of the image pixels, to obtain an image information of the outputted colors that are supported by the electronic device.

10. The image processing system according to claim 9, wherein the system further comprises an information relaying device and a gateway device;
the server is further configured for sending the target-image information and the displaying protocol to the information relaying device;
the information relaying device is configured for receiving the target-image information and the displaying protocol, and sending the target-image information and the displaying protocol to the gateway device; and
the gateway device is configured for receiving the target-image information and the displaying protocol, and sending the target-image information and the displaying protocol to the electronic device by using a predetermined communication protocol.

11. The image processing system according to claim 10, wherein the predetermined communication protocol comprises LoRa or WiFi.

12. The image processing system according to claim 9, wherein the displaying protocol contains a scanning mode supported by the electronic device, and the electronic device is further configured for:
according to the scanning mode supported by the electronic device, performing refresh-scanning to the displayed-image information and displaying the displayed-image information on the screen of the electronic device;
wherein the scanning mode comprises a scanning starting point and a scanning direction that are supported by the electronic device, the scanning starting point is one of four corners of the screen, and the scanning direction is an anticlockwise direction or a clockwise direction.

13. The image processing system according to claim 9, wherein the screen of the electronic device is an electrophoretic display screen.

14. An electronic device, wherein the electronic device comprises:
a processor; and
a memory configured for storing a computer instruction executable by the processor;
wherein the processor is configured for executing the computer instruction, to implement the image processing method applied to the server according to claim 1.

15. An electronic device, wherein the electronic device comprises:
a processor; and
a memory configured for storing a computer instruction executable by the processor;
wherein the processor is configured for executing the computer instruction, to implement the image processing method applied to the electronic device according to claim 6.

16. A non-transient computer storage medium, wherein when an instruction in the storage medium is executed by a processor of an electronic device, the instruction enables the electronic device to implement the image processing method applied to the server according to claim 1.

17. A non-transient computer storage medium, wherein when an instruction in the storage medium is executed by a processor of an electronic device, the instruction enables the electronic device to implement the image processing method applied to the electronic device according to claim 6.

18. A computer program product, wherein when an instruction in the computer program product is executed by a processor of an electronic device, the instruction enables the electronic device to implement the image processing method applied to the server according to claim 1.

19. A computer program product, wherein when an instruction in the computer program product is executed by a processor of an electronic device, the instruction enables the electronic device to implement the image processing method applied to the electronic device according to claim 6.

* * * * *